(12) United States Patent
Ono et al.

(10) Patent No.: US 11,469,601 B2
(45) Date of Patent: *Oct. 11, 2022

(54) BATTERY CONTROL UNIT AND BATTERY SYSTEM

(71) Applicant: YAZAKI CORPORATION, Tokyo (JP)

(72) Inventors: Chihiro Ono, Susono (JP); Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 124 days.

This patent is subject to a terminal disclaimer.

(21) Appl. No.: 17/014,339

(22) Filed: Sep. 8, 2020

(65) Prior Publication Data

US 2021/0075230 A1 Mar. 11, 2021

(30) Foreign Application Priority Data

Sep. 10, 2019 (JP) .............................. JP2019-164719

(51) Int. Cl.
*H02J 7/00* (2006.01)
*H02J 7/36* (2006.01)

(52) U.S. Cl.
CPC ............ *H02J 7/0016* (2013.01); *H02J 7/005* (2020.01); *H02J 7/007182* (2020.01); *H02J 7/0013* (2013.01); *H02J 7/36* (2013.01)

(58) Field of Classification Search
CPC .... H02J 7/0016; H02J 7/005; H02J 7/007182; H02J 7/0014; H02J 7/0018; H02J 7/0019;

(Continued)

(56) References Cited

U.S. PATENT DOCUMENTS

| 5,631,533 A | 5/1997 | Imaseki |
| 5,666,040 A * | 9/1997 | Bourbeau ......... H01M 10/4257 |
| | | 320/147 |

(Continued)

FOREIGN PATENT DOCUMENTS

| JP | 7-87673 A | 3/1995 |
| JP | 7-255133 A | 10/1995 |

(Continued)

OTHER PUBLICATIONS

EPO search report for EP3793057 (patent family), published Feb. 8, 2021, https://register.epo.org/application?tab=doclist&number=EP20193068&lng=en (Year: 2021).*

(Continued)

*Primary Examiner* — John T Trischler
(74) *Attorney, Agent, or Firm* — Sughrue Mion, PLLC

(57) ABSTRACT

A battery control unit includes a plurality of switching units, a control unit, a charger configured to charge batteries, and a charging control unit. The plurality of switching units is respectively provided for a plurality of batteries connected in series, and are configured to switch between a connected state and a non-connected state. The connected state is a state that a corresponding battery is connected in series with other batteries and the non-connected state is a state that the corresponding battery is disconnected from a series connection with the other batteries. The control unit is configured to determine whether each voltage of the plurality of batteries reaches a charge end voltage during charging, and to control the switching unit corresponding to the battery which is determined to reach the charge end voltage to switch to the non-connected state.

5 Claims, 3 Drawing Sheets

(58) Field of Classification Search
CPC ............... B60L 11/1866; B60L 58/22; H01M 2010/4271
USPC ......................................................... 320/122
See application file for complete search history.

(56) References Cited

U.S. PATENT DOCUMENTS

| | | | |
|---|---|---|---|
| 5,825,155 A | 10/1998 | Ito et al. | |
| 5,903,131 A | 5/1999 | Sekine et al. | |
| 5,952,815 A * | 9/1999 | Rouillard | H02J 7/0021 320/122 |
| 6,060,864 A | 5/2000 | Ito et al. | |
| 6,064,179 A | 5/2000 | Ito et al. | |
| 7,557,538 B2 * | 7/2009 | Yau | H02J 7/0016 320/122 |
| 7,696,725 B2 * | 4/2010 | Liu | H02J 7/0018 320/136 |
| 8,179,139 B2 * | 5/2012 | Kawasumi | H01M 10/42 324/426 |
| 9,112,370 B2 * | 8/2015 | Yen | H02J 7/007 |
| 10,250,045 B2 * | 4/2019 | Sherstyuk | H02J 7/0021 |
| 10,300,806 B2 * | 5/2019 | Paik | B60L 58/16 |
| 10,923,923 B2 * | 2/2021 | Sherstyuk | H02J 7/00711 |
| 11,081,899 B2 * | 8/2021 | Ono | H02J 7/0068 |
| 11,128,153 B1 * | 9/2021 | Cho | H02J 7/007184 |
| 2005/0083016 A1 * | 4/2005 | Yau | H02J 7/0016 320/116 |
| 2006/0255769 A1 * | 11/2006 | Liu | H01M 10/441 320/134 |
| 2008/0129225 A1 * | 6/2008 | Yamamoto | H02M 3/07 315/307 |
| 2009/0066291 A1 * | 3/2009 | Tien | H02J 7/0016 320/118 |
| 2009/0251100 A1 * | 10/2009 | Incledon | H02J 7/00306 320/137 |
| 2010/0237829 A1 * | 9/2010 | Tatebayashi | H01M 10/441 320/118 |
| 2010/0253284 A1 * | 10/2010 | Aoki | H02J 7/0016 320/136 |
| 2011/0313613 A1 * | 12/2011 | Kawahara | B60L 58/15 320/134 |
| 2012/0306448 A1 * | 12/2012 | Lu | H02J 7/0016 320/118 |
| 2013/0035813 A1 * | 2/2013 | Kusumi | B60L 58/16 701/22 |
| 2013/0151183 A1 * | 6/2013 | Nam | H02J 7/005 702/63 |
| 2013/0187608 A1 * | 7/2013 | Yen | H02J 7/0016 320/118 |
| 2014/0021923 A1 * | 1/2014 | Uchida | H02J 7/0016 320/118 |
| 2014/0117975 A1 * | 5/2014 | Shimomura | G01R 19/2503 327/408 |
| 2017/0117721 A1 * | 4/2017 | Toya | H02J 7/0016 |
| 2017/0179760 A1 * | 6/2017 | Jawany | H02J 9/061 |
| 2018/0191176 A1 * | 7/2018 | Sherstyuk | H02J 7/008 |
| 2019/0222037 A1 * | 7/2019 | Sherstyuk | H02J 7/00711 |
| 2020/0028375 A1 * | 1/2020 | Ono | H01M 10/441 |
| 2020/0274368 A1 * | 8/2020 | Crouse, Jr. | H02J 7/00309 |
| 2020/0321788 A1 * | 10/2020 | Ono | H02J 7/0025 |
| 2020/0321789 A1 * | 10/2020 | Ono | H02J 7/0019 |
| 2021/0098996 A1 * | 4/2021 | Ono | H01M 10/441 |
| 2021/0234380 A1 * | 7/2021 | Ono | H01M 50/502 |
| 2021/0273461 A1 * | 9/2021 | Lin | H02J 7/0016 |
| 2021/0296912 A1 * | 9/2021 | Cho | H02J 7/007184 |
| 2021/0399557 A1 * | 12/2021 | Ono | H02J 7/0016 |
| 2021/0399558 A1 * | 12/2021 | Ono | H02J 7/0048 |
| 2022/0045524 A1 * | 2/2022 | Syouda | H02J 7/0019 |
| 2022/0060029 A1 * | 2/2022 | Syouda | H02J 7/0016 |
| 2022/0060030 A1 * | 2/2022 | Ono | H02J 1/10 |

FOREIGN PATENT DOCUMENTS

| | | |
|---|---|---|
| JP | 9-266638 A | 10/1997 |
| JP | 2003-289629 A | 10/2003 |
| JP | 2008-125158 A | 5/2008 |
| JP | 2013-31249 A | 2/2013 |
| WO | 2012105448 A1 | 8/2012 |
| WO | 2013015162 A1 | 1/2013 |

OTHER PUBLICATIONS

EPO search opinion for EP3793057 (patent family), published Feb. 8, 2021, https://register.epo.org/application?tab=doclist&number=EP20193068&lng=en (Year: 2021).*

EPO search opinion for EP3793057 (patent family), published Dec. 16, 2021, https://register.epo.org/application?tab=doclist&number=EP20193068&lng=en (Year: 2021).*

* cited by examiner

CHARGER

BATTERY CONTROL UNIT AND BATTERY SYSTEM

CROSS REFERENCE TO RELATED APPLICATIONS

This application claims priority from Japanese Patent Application No. 2019-164719 filed on Sep. 10, 2019, the entire contents of which are incorporated herein by reference.

BACKGROUND OF THE INVENTION

Field of the Invention

The present invention relates to a battery control unit and a battery system.

Description of Related Art

There are battery systems configured by connecting a plurality of batteries in series. Deterioration of die plurality of batteries varies due to variations in manufacturing or variations in operating environments, for example. For example, a battery that is close to a heat source rapidly deteriorates, while a battery that is remote from the heat source slowly deteriorates.

Therefore, the battery that has deteriorated at the time of charging or discharging reaches a charge end voltage first. In this case, the charging have to be stopped even if there is remaining capacity in the other batteries, thus capacity of the batteries cannot be entirely consumed. Therefore, there has been proposed a system that bypasses a battery that has reached the charge end voltage, disconnects the battery from charging and continues charging of batteries that have not reached the charge end voltage (Patent Literature 1).

In general, CCC V charging is performed to prevent a battery from overcharging. The CCCV charging refers to charging that combines constant current charging (CC: constant current) and constant voltage charging (CV: constant voltage). In the CCCV charging, the constant current charging is performed until the battery reaches a charge switching voltage, and the charging is switched to the constant voltage charging to reduce a charging current when the charge switching voltage is reached.

[Patent Literature 1] JP-A-2013-31249

For example, when three batteries (B1 to B3) are charged by CCCV charging, it is assumed that the charging is performed as follows. When the battery B1 reaches the charge end voltage, only the battery B1 is bypassed and the batteries B2, B3 are charged by CCCV charging. Thereafter, when the battery B2 reaches the charge end voltage, the battery B2 is also, bypassed, and only the battery B3 is charged by CCCV charging finally. However, in such a charging method, when the battery B1 needs to switch from the constant current charging to the constant voltage charging to reduce the charging current, the charging current has to be reduced to performing charging in accordance with the battery B1 while the batteries B2, B3 are still in a stale where the charging current does not have to be reduced. Therefore, charging time may become long.

SUMMARY

One or more embodiments provide a battery control unit and a battery system capable of shortening the charging time.

According to one or more embodiments, a battery control unit includes a plurality of switching units, a control unit, a charger configured to charge batteries, and a charging control unit. The plurality of switching units are respectively provided for a plurality of batteries connected in series, and are configured to switch between a connected state and a non-connected state. The connected state is a state that a corresponding battery is connected in series with other batteries and the non-connected state is a state that the corresponding battery is disconnected from a series connection with the other batteries. The control unit is configured to determine whether each voltage of the plurality of batteries reaches a charge end voltage during charging, and to control the switching, unit corresponding to the battery which is determined to reach the charge end voltage to switch to the non-connected state. The charging control unit is configured to perform constant current charging of the batteries, to determine whether remaining chargeable capacity reaches a predetermined charge switching capacity during the constant current charging, to control the switching unit corresponding to the battery which is determined to reach the charge switching capacity to switch to the non-connected state, to control all the batteries to switch to the connected state and switch to constant voltage charging when the remaining chargeable capacity of all the batteries reaches the charge switching capacity, and to perform the constant voltage charging of the batteries.

DETAILED DESCRIPTION

A specific embodiment according to the present invention will be described below with reference to drawings.

Figure 1:
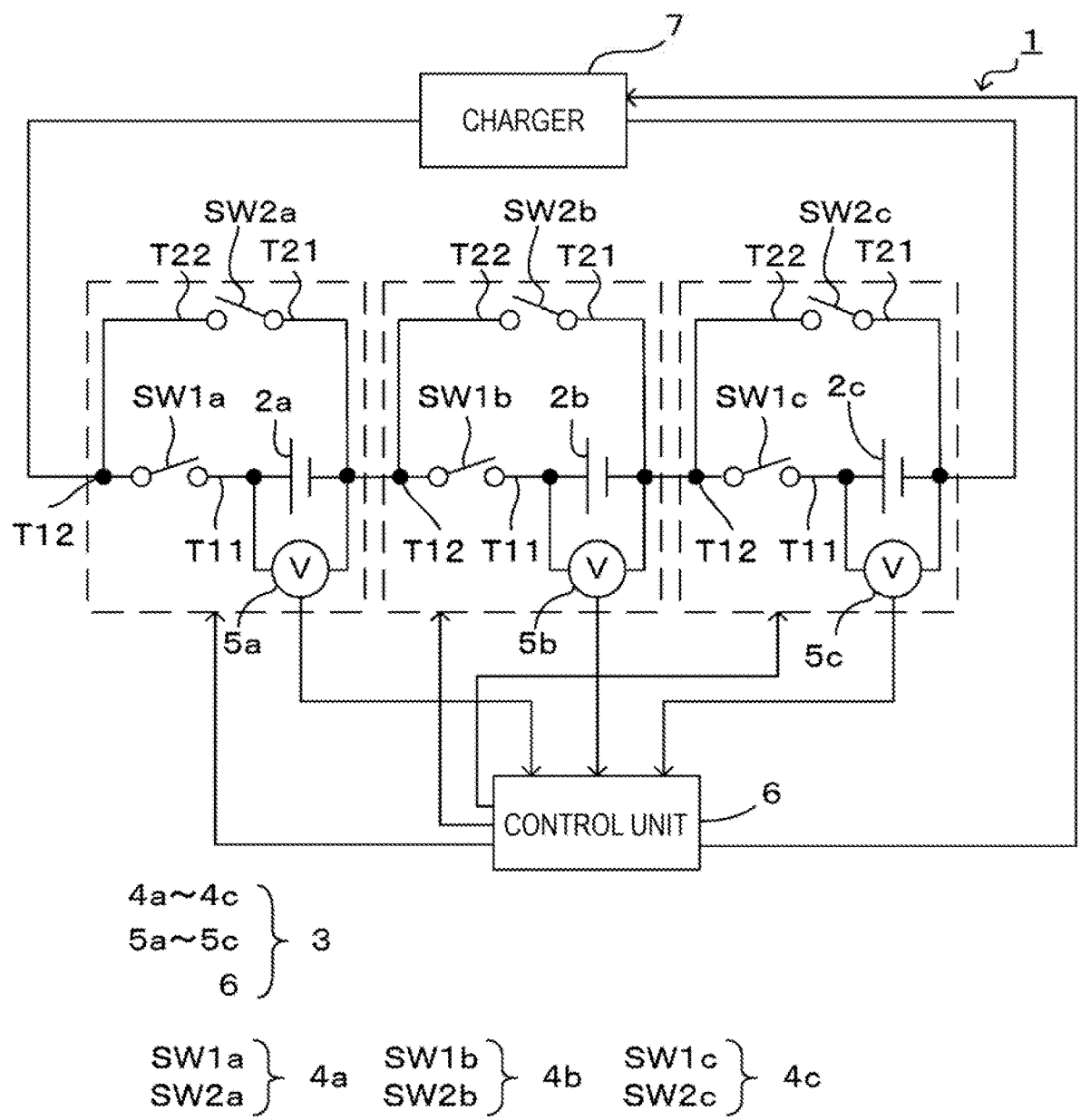
FIG. 1 is a circuit diagram showing a battery system of the present invention.

A battery system shown in FIG. 1 is, for example, a device that reuses a deteriorated battery to supply power.

As shown in FIG. 1, a battery system 1 includes a plurality of batteries 2a to 2c and a battery control unit 3. Although an example in which the three batteries 2a to 2c are connected in series will be described in the present embodiment to simplify the description, the present invention is not limited thereto. The number of the batteries 2a to 2c may be two, or four or more as long as the number is plural. Each of the plurality of batteries 2a to 2c is a chargeable and dischargeable storage battery, and may be configured by one cell, or may be configured by a plurality of cells.

The battery control unit 3 includes a plurality of switching units 4a to 4c, a plurality of voltage measuring units 5a to 5c, a control unit 6 and a charger 7. The plurality of switching units 4a to 4c are provided corresponding to the plurality of batteries 2a to 2c, respectively. The plurality of switching units 4a to 4c have the same configuration.

The switching units 4a to 4c can switch between a connected state where the corresponding batteries 2a to 2c are connected in series to the other batteries 2a to 2c and a non-connected state where the series connection between the corresponding batteries 2a to 2c and the other batteries 2a to 2c are disconnected. Specifically, the batteries 2a to 2c which are switched to the connected state by the switching units 4a to 4c are connected in series and used as a power supply. On the other hand, the batteries 2a to 2c which are switched to the non-connected state by the switching units 4a to 4c are disconnected from the batteries 2a to 2c in the connected state and are not used as the power supply.

The switching unit 4a includes a first switch SW1a which is connected in series to the batter 2a, and a second switch SW2a which is connected in parallel to the battery 2a and the first switch SW1a. One end T11 of the first switch SW1a is connected to one electrode (for example, a positive electrode) of the battery 2a. One end T21 of the second switch SW2a is connected to the other electrode (for example, a negative electrode) of the battery 2a, while the other end T22 thereof is connected to the other end T12 of the first, switch SW1a. The switching units 4b, 4c can be described by replacing "a" in the above description of the switching unit 4a with "b" and "c", respectively, thus a detailed description thereof is omitted.

The other end T12 of the first switch SW1b is connected to the negative electrode of the battery 2a, while the other end T12 of the first switch SW1c is connected to the negative electrode of the battery 2b. That is, the first switches SW1b, SW1c are respectively connected between the adjacent batteries 2a and 2b and between the adjacent batteries 2b and 2c.

According to the above configuration, when the second switches SW2a to SW2c are turned off while the first switches SW1a to SW1c are turned on, the corresponding batteries 2a to 2c are in the connected state. When the first switches SW1a to SW1c are turned off, the corresponding batteries 2a to 2c are in the non-connected state. At this time, when the second switches SW2a to SW2c are turned on, a bypass path is formed, and only the batteries 2a to 2c which are in the connected state are connected in series.

The plurality of voltage measuring units 5a to 5c measure both-end voltages of the corresponding batteries 2a to 2c and output measurement results thereof to the control unit 6 described below.

The control unit 6 is configured by known CPU, ROM, and RAM, and controls the entire battery system 1. The control unit 6 controls on and off of the first switches SW1a to SW1c and the second switches SW2a to SW2c based on the both-end voltages of the batteries 2a to 2c.

The charger 7 is connected to two ends of the batteries 2a to 2c and charges the batteries 2a to 2c. The charger 7 can be switched between constant current charging and constant voltage charging. The control unit 6 controls the charger 7 to switch between the constant current charging and the constant voltage charging.

Figure 2A:
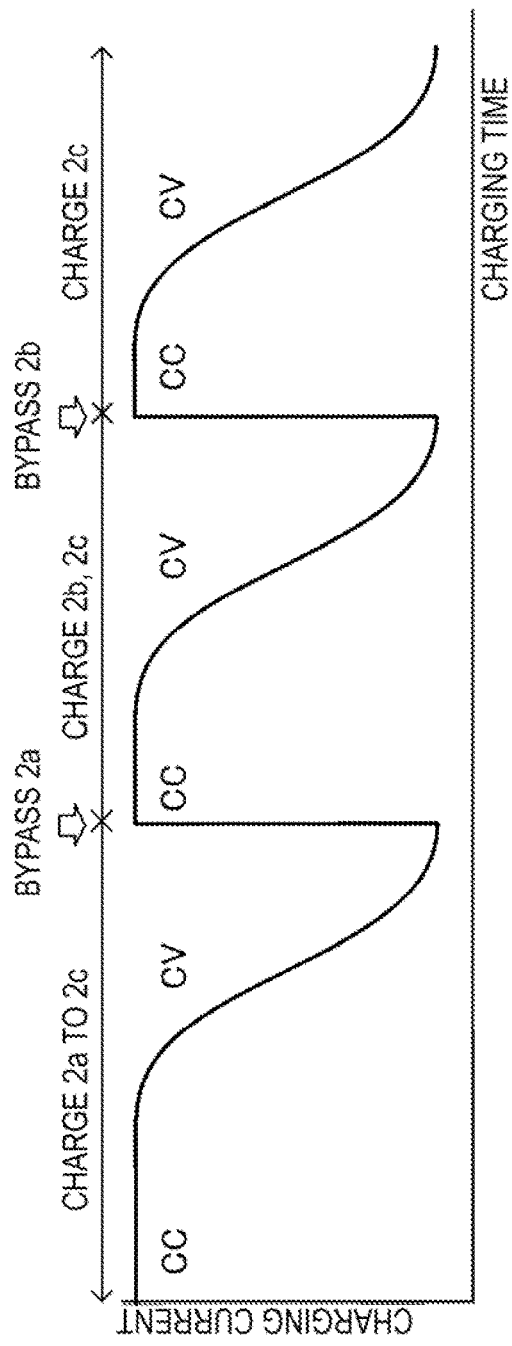
FIG. 2A is a time chart of a battery system in related art.

Next, an outline of an operation of the battery system 1 will be described below with reference to FIGS. 2A and 2B. In the example shown in FIGS. 2A and 2B, it is assumed that capacity decreases due to deterioration in an order of the battery 2c>the battery 2b>the battery 2a. In related art, as shown in FIG. 2A, first, the control unit 6 switches the charger 7 to the constant current charging (CC), and the batteries 2a to 2c are charged by the constant current charging. Thereafter, the battery 2a reaches a charge switching voltage (for example, 3.8 V) first, then the control unit 6 switches the charger 7 to the constant voltage charging (CV), and the batteries 2a to 2c are charged by the constant voltage charging. When the battery 2a reaches a charge end voltage (for example, 41.2 V), the control unit 6 switches the battery 2a to the non-connected state to bypass the battery 2a, and switches the charger 7 to the constant current charging. As a result, the batteries 2b, 2c are charged by the constant current charging. When the battery 2b reaches the charge switching voltage, the control unit 6 switches the charger 7 to the constant voltage charging, and the batteries 2b, 2c are charged by the constant voltage charging. When the battery 2b reaches the charge end voltage, the control unit 6 bypasses the battery 2b and switches the charger 7 to the constant current charging. As a result, the battery 2c is charged by the constant current charging. When the battery 2c reaches the charge switching voltage, the control unit 6 switches the charger 7 to the constant voltage charging, and the battery 2c is charged by the constant voltage charging. When the battery 2c reaches the charge end voltage, the charging is ended.

Figure 2B:
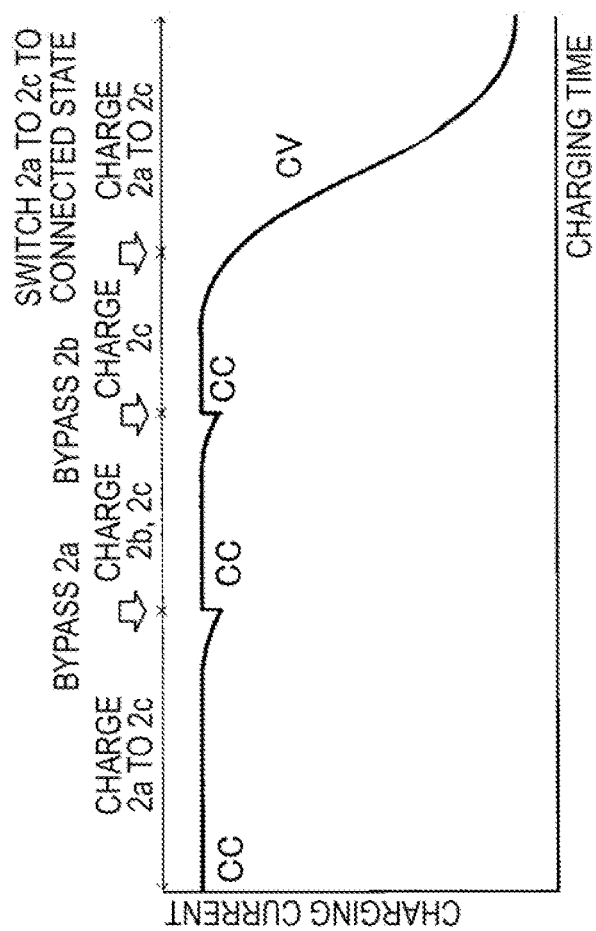
FIG. 2B is a time chart of the battery system shown in FIG. 1.

In contrast, in the present embodiment, as shown in FIG. 2B, the control unit 6 functions as a charging control unit, switches the charger 7 to the constant current charging (CC), and the batteries 2a to 2c are charged by the constant current charging. When remaining chargeable capacity (Ah) of the battery 2a reaches predetermined charge switching capacity first, the control unit 6 bypasses the battery 2a and continues the constant current charging of the batteries 2b, 2c. Here, the remaining chargeable capacity indicates an amount of electricity that can be charged in the batteries 2a to 2c, that is, how much electricity can be charged thereafter.

Next, when the remaining chargeable capacity of the battery 2b reaches the charge switching capacity, the control unit 6 bypasses the battery 2b and continues the constant current charging of the battery 2c. When the remaining chargeable capacity of the battery 2c reaches the charge switching capacity, the control unit 6 returns all the batteries 2a to 2c to the connected state, decreases a charging current by the charger 7 until any one of the batteries 2a to 2c reaches the charge end voltage, and switches the charging to the constant voltage charging. Thereafter, the control unit 6 decreases the charging current by the charger 7 so as not to exceed the batteries 2a to 2c, and ends the charging when a predetermined charge end condition is satisfied. The charge end condition is, for example, when all the batteries 2a to 2c are within a predetermined range based on the charge end voltage, when a predetermined period of time has elapsed during the CV charging, or when the charging current is equal to or less than a predetermined value.

As is clear from FIG. 2A, in the related art, the CV charging has to be performed as many times as the number of the batteries 2a to 2c. On the other hand, in the present embodiment, the constant voltage charging can be completed at one time regardless of the number of the batteries 2a to 2c by aligning the remaining chargeable capacity (Ah) of all the batteries 2a to 2c with the charge switching capacity, so that charging time can be shortened.

The above-mentioned charge switching capacity has the same value between the batteries 2a to 2c. That is, in the present embodiment, the remaining chargeable, capacity (Ah) of the batteries 2a to 2c are aligned at timing when the charging, is switched from the constant current charging to the constant voltage charging. Therefore, the constant voltage charging is performed such that the batteries 2a to 2c can reach the charge end voltage at the same timing. As shown in FIG. 2B, the constant voltage charging can be completed at one time. If the timing of reaching the charge end voltage of the batteries 2a to 2c becomes different, it is necessary to bypass the batteries 2a to 2c that have reached the charge end voltage. As in the present embodiment, the charging time can be shortened by performing the constant voltage charging at one time at last.

Next, determination of whether the remaining chargeable capacity (Ah) of the batteries 2a to 2c reaches the charge switching capacity performed by the control unit 6 will be described in detail. The control unit 6 determines that the remaining chargeable capacity (Ah) reaches the charge switching capacity when both-end voltages of the batteries 2a to 2c reach thresholds set for each of the batteries 2a to 2c. A method of setting the threshold will be described below.

Here, initial total capacity (Ah) of the batteries 2a to 2c is referred to as Aia, Aib, and Aic, SOC (%) of the batteries 2a to 2c is referred to as SOCa, SOCb, and SOCc, and SOH (%) of the batteries 2a to 2c is referred to as SOHa, SOHb, and SOHc. Remaining chargeable capacity Ara, Arb, Arc of the batteries 2a to 2c can be obtained from the following equations (1) to (3).

$$Ara = Aia \times SOHa \times (1-SOCa) \quad (1)$$

$$Arb = Aib \times SOHb \times (1-SOCb) \quad (2)$$

$$Arc = Aic \times SOHc \times (1-SOCc) \quad (3)$$

The SOH (%) indicates the deterioration degree and indicates a ratio of current total capacity (Ah) to the initial total capacity (Ah). The SOC (%) indicates a charge state, and indicates a ratio of a remaining chargeable amount (Ah) to the current total capacity (Ah).

The control unit 6 obtains SOCa, SOCb, SOCc (%) when the remaining chargeable capacity Ara, Arb, Arc shown in the above equations (1) to (3) become the same charge switching capacity A. The charge switching capacity A is set within a range in which none of the batteries 2a to 2c reaches the charge end voltage during the CC charging. The obtained SOCa SOCb, SOCK. (%) are shown in the following equations (4) to (6).

$$SOCa = 1 - (A/(Aia \times SOHa)) \quad (4)$$

$$SOCb = 1 - (A/(Aib \times SOHb)) \quad (5)$$

$$SOCc = 1 - (A/(Aic \times SOHc)) \quad (6)$$

The initial total capacity Aia, Aib, Aic of the batteries 2a to 2c of the above equations (4) to (6) are predetermined for each type and each manufacturer of the batteries 2a to 2c, for example. Since the SOH (%) is known to be dependent on internal resistance of the batteries 2a to 2c, the SOH (%) is obtained by measuring the internal resistance. In the present embodiment, for example, the control unit 6 obtains a ratio of current internal resistance of the batteries 2a to 2c to initial internal resistance of the batteries 2a to 2c as the SOH (%). A method of obtaining the SOH (%) is, not limited thereto, and the SOH (%) may also be obtained through using other known methods.

Next, the control unit 6 obtains open circuit voltages (OCV) of the batteries 2a to 2c when SOCa, SOCb, and SOCc are obtained as in the equations (4) to (6), and sets the obtained OCVs as the thresholds. A relationship between the SOC and the OCV (open circuit voltage) of the batteries 2a to 2c is known in advance as an SOC-OCV curve. The control unit 6 obtains the OCVs with respect to the SOCa SOCb, SOCc obtained by the equations (4) to (6) from the SOC-OCV curve, and sets thresholds Va, Vb, Vc.

Figure 3:
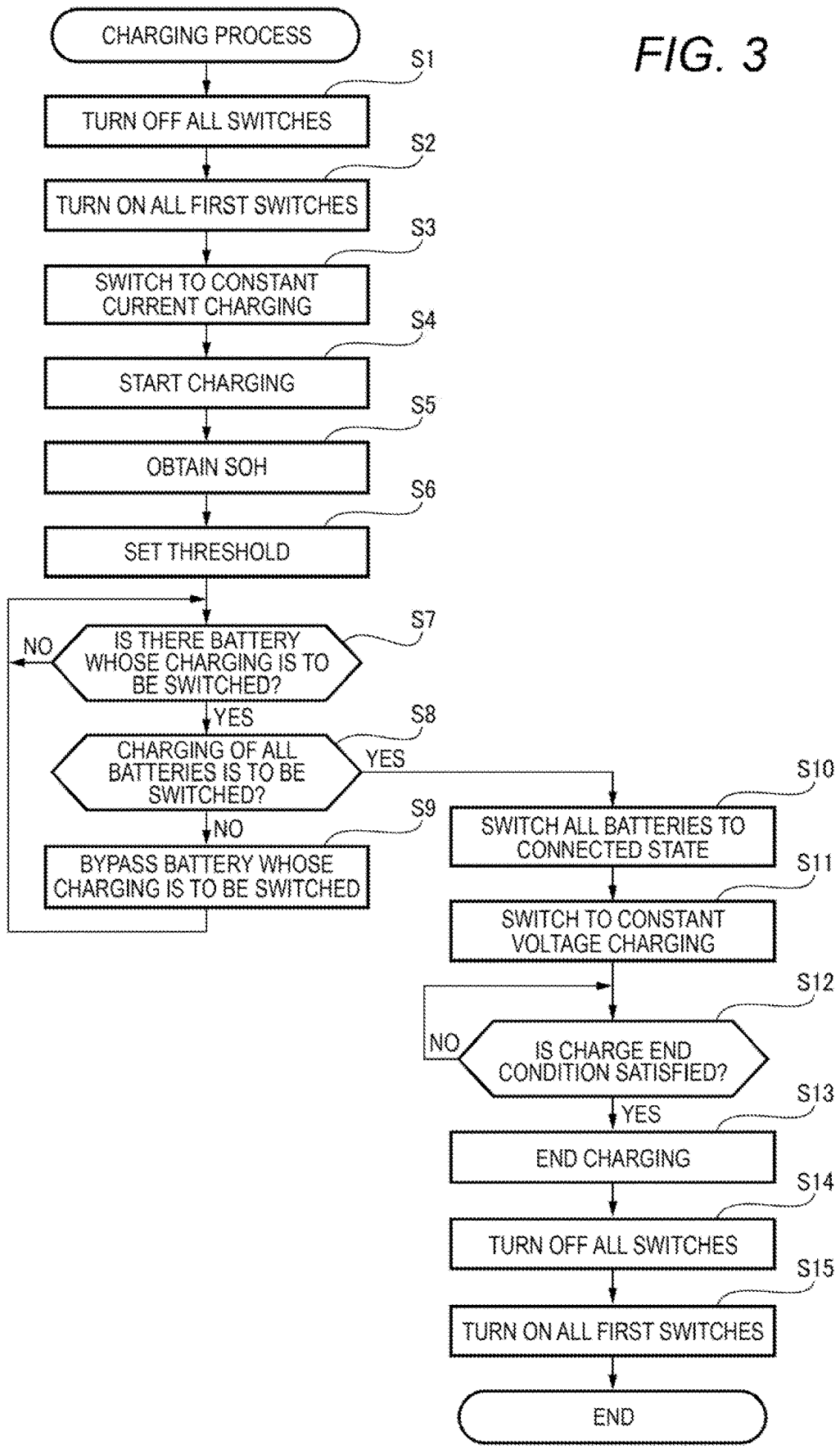
FIG. 3 is a flowchart showing a charging processing procedure of a control unit included in the battery system shown in FIG. 1.

Next, a detailed operation of the battery system 1 described in the above outline will be described below with reference to FIG. 3. FIG. 3 is a flowchart showing a charging processing procedure of the control unit 6 shown in FIG. 1.

Upon receiving a charging command, the control unit 6 starts a charging process shown in FIG. 3. First, the control unit 6 turns off all the first switches SW1a to SW1c and all the second switches SW2a to SW2c (step S1). Thereafter, the control unit 6 turns on all the first switches SW1a to SW1c (step S2), and connects all the batteries 2a to 2c in series. Next, after switching the charger 7 to the constant current charging (step S3), the control unit 6 connects the charger 7 to the batteries 2a to 2c to start the constant current charging (step S4).

Next, the control unit 6 functions as a deterioration degree calculation unit and measures the internal resistance of the batteries 2a to 2c to obtain the SOCa SOCb, SOCc (step S5). As the measurement of the internal resistance, for example, the charger 7 is controlled to flow two different types of charging currents in the batteries 2a to 2c, and the internal resistance can be obtained from the both end voltages detected at, that time. The control unit 6 functions as a threshold setting unit, and sets the thresholds Va, Vb, Vc for each of the batteries 2a to 2c as described above based on the obtained SOCa, SOCb, SOCc (step S6).

Next, the control unit 6 acquires the both-end voltages of the batteries 2a to 2c measured by the voltage measuring units 5a to 5c, and compares the acquired voltages with the thresholds Va, Vb, Vc (step S7). As a result of the comparison, if no battery 2a to 2c reaches the thresholds Va, Vb, Vc among the batteries 2a to 2c in the connected state, the control unit 6 determines that there is no battery 2a to 2c whose charging is to be switched (N in step S7) and returns to step S7.

On the other hand, as the result of the comparison, if there is a battery among the batteries 2a to 2c that has reached the thresholds Va, Vb, Vc, the control unit 6 determines that there is a battery among the batteries 2a to 2c whose charging is to be switched (Y in step S7) and determines whether all the batteries 2a to 2c have reached the thresholds Va, Vb, Vc (step S8). If not all the batteries 2a to 2c have reached the thresholds Va, Vc (N in step SB), the control unit 6 bypasses the batteries 2a to 2c that are determined in step S7 to have reached the thresholds Va, Vb, Vc (step S9), and returns to step S7.

If all the batteries 2a to 2c have reached the thresholds Va, Vb, Vc (Y in step S8), the control unit 6 switches all the batteries 2a to 2c to the connected state (step S10), and switches the charger 7 to the constant voltage charging (step S11).

Next, the control unit 6 acquires the both-end voltages of the batteries 2a to 2c measured by the voltage measuring units 5a to 5c and compares the acquired voltages with the charge end voltage (4.2 V) (step S12). As a result of the comparison, if the above-described charge end condition is not satisfied (N in step S12), the control unit 6 returns to step S12.

On the other hand, as the result of the comparison, if the charge end condition is satisfied (Y in step S12), the control unit 6 stops the charging (step S13).

Thereafter, the control unit 6 turns off all the first switches SW1a to SW1c and all the second switches SW2a to SW2c (step S14), then turns on all the first switches SW1a to SW1c (step S15), and ends the processing.

The present invention is not limited to the above-described embodiment and may be appropriately modified, improved, or the like. Materials, shapes, dimensions, numbers, arrangement positions, and the like of constituent elements in the embodiment described above are optional without being limited as long as the present invention can be achieved.

Although the switching units 4a to 4c include the first switches SW1a to SW1c and the second switches SW2a to SW2c according to the embodiment described above, the present invention is not limited thereto. The switching units 4a to 4c may include a switching switch configured to select one of the batteries 2a to 2c or a bypass circuit connected in parallel to the batteries 2a to 2c.

Although the thresholds of the both-end voltages of the batteries 2a to 2c are set according to the embodiment described above, the present invention is not limited thereto. Thresholds of the SOC of the batteries 2a to 2c may also be set. In this case, the control unit 6 obtains the SOC from the both-end voltages of the batteries 2a to 2c, and determines that the remaining chargeable capacity (Ah) of the batteries 2a to 2c reaches the charge switching capacity when the obtained SOC reaches the thresholds.

The control unit 6 may calculate the current chargeable capacity from the SOH obtained by measuring the both-end voltages and the internal resistance of the batteries 2a to 2c, and compare the calculated chargeable capacity with the charge switching capacity.

In an aspect [1], a battery control unit (3) includes a plurality of switching units (4a to 4c), a control unit (6), a charger (7) configured to charge batteries (2a to 2c), and a charging control unit (6). The plurality of switching units (4a to 4c) are respectively provided for a plurality of batteries (2a to 2c) connected in series, and are configured to switch between a connected state and a non-connected state. The connected state is a state that a corresponding battery (2a to 2c) is connected in series with other batteries (2a to 2c) and a non-connected state is a state that the corresponding battery (2a to 2c) is disconnected from the series connection with the other batteries (2a to 2c). The control unit (6) is configured to determine whether each voltage of the plurality of batteries reaches a charge end voltage during charging, and to control the switching unit (4a to 4c) corresponding to the battery (2a to 2c) which is determined to reach the charge end voltage to switch to the non-connected state. The charging control unit (6) is, configured to perform constant current charging of the batteries (2a to 2c), determine whether remaining chargeable capacity reaches a predetermined charge switching capacity during the constant current charging, control the switching unit (4a to 4c) corresponding to the batter)/(2a to 2c) which is determined to reach the charge switching capacity to switch to the non-connected state, control all the batteries (2a to 2c) to switch to the connected state and switch to constant voltage charging when the remaining chargeable capacity of ail the batteries (2a to 2c) reaches the charge switching capacity, and perform the constant voltage charging of the batteries (2a to 2c).

In an aspect [2], the battery control unit (3) according to [1], may further includes a deterioration degree calculation unit configured to calculate a deterioration degree for each of the plurality of batteries (2a to 2c), and a setting unit configured to set a threshold of a charge state or a both-end voltage for each of the batteries (2a to 2c) according to the deterioration degree calculated by the deterioration degree calculation unit. The charge control unit (6) may determine that the chargeable capacity reaches the charge switching capacity when the charge state or the both-end voltage of the batteries (2a to 2c) reaches the threshold set corresponding to the batteries (2a to 2c).

In an aspect [3], a battery system (1) may include a plurality of batteries (2a to 2c) connected in series, and the battery control unit (3) according to [1] or [2].

According to the aspects [1] and [3], the charging control unit performs the constant current charging of the batteries, determines whether the remaining chargeable capacity reaches the predetermined charge switching capacity during the constant current charging, controls the switching unit corresponding to the battery which is determined to reach the charge switching capacity to switch to the non-connected state, controls all the batteries to switch to the connected state and switches to constant voltage charging when the remaining chargeable capacity of all the batteries reaches the charge switching capacity, and performs the constant voltage charging of the batteries. That is, the constant current charging can be performed until the remaining chargeable capacity of all the batteries reaches the charge switching capacity, and the charging can be switched to the constant voltage charging when the charge switching capacity is reached, so that charging time of the plurality of batteries can be shortened. The switching between the constant voltage charging and the constant current charging is performed based on whether the remaining chargeable capacity reaches the charge switching capacity, and the constant voltage charging can be completed at last only once.

According to the aspect [2], whether the chargeable capacity has reached the charge switching capacity can be accurately determined based on the deterioration degree.

According to one or more embodiments, the battery control unit and the battery system capable of shortening the charging time can be provided.

What is claimed is:

1. A battery control unit comprising:
   a plurality of switching units;
     a control unit;
     a charger configured to charge batteries; and
     a charging control unit,
   wherein the plurality of switching units are respectively provided for a plurality of batteries connected in series, and are configured to switch between a connected state and a non-connected state,
     wherein the connected state is a state that a corresponding battery is connected in series with other batteries and the non-connected state is a state that the corresponding battery is disconnected from a series connection with the other batteries,
   wherein the control unit is configured to determine whether each voltage of the plurality of batteries reaches a charge end voltage during charging, and to control the switching unit corresponding to the battery which is determined to reach the charge end voltage to switch to the non-connected state, and
   wherein the charging control unit is configured to perform constant current charging of the batteries, to determine whether remaining chargeable capacity reaches a predetermined charge switching capacity during the constant current charging, to control the switching unit corresponding to the battery which is determined to reach the predetermined charge switching capacity to switch to the non-connected state, to control all the batteries to switch to the connected state and switch to constant voltage charging when the remaining chargeable capacity of all the batteries reaches the predetermined charge switching capacity, and to perform the constant voltage charging of the batteries.

2. A battery system comprising:
   a plurality of batteries connected in series; and
     the battery control unit according to claim 1.

3. The battery control unit according to claim 1, wherein the charging control unit is further configured to, after controlling all the batteries to switch to the connected state and switch to constant voltage charging when the remaining chargeable capacity of all the batteries reaches the predetermined charge switching capacity:

determine whether a charge end condition is satisfied while the constant voltage charging of all of the batteries is performed; and stop charging of all of the batteries based on determining that the charge end condition is satisfied while the constant voltage charging of all of the batteries is performed.

4. The battery control unit according to claim 1 further comprising:

a deterioration degree calculation unit configured to calculate a deterioration degree for each of the plurality of batteries; and a setting unit configured to set a threshold of a charge state or a both-end voltage for each of the batteries according to the deterioration degree calculated by the deterioration degree calculation unit, wherein the charging control unit determines that a chargeable capacity reaches the predetermined charge switching capacity when the charge state or the both-end voltage of the batteries reaches the threshold set corresponding to the batteries.

5. A battery system comprising:

a plurality of batteries connected in series; and
the battery control unit according to claim 4.

* * * * *